(12) United States Patent
Bacastow et al.

(10) Patent No.: US 8,494,962 B2
(45) Date of Patent: Jul. 23, 2013

(54) METHOD AND SYSTEM FOR SECURE MOBILE REMITTANCE

(75) Inventors: Steven V. Bacastow, Cumming, GA (US); Elmer Floyd Arnold, III, Cumming, GA (US)

(73) Assignee: SKC&C USA, Inc., Alpharetta, GA (US)

( * ) Notice: Subject to any disclaimer, the term of this patent is extended or adjusted under 35 U.S.C. 154(b) by 0 days.

(21) Appl. No.: 13/245,498

(22) Filed: Sep. 26, 2011

(65) Prior Publication Data

US 2012/0078792 A1 Mar. 29, 2012

Related U.S. Application Data

(60) Provisional application No. 61/386,320, filed on Sep. 24, 2010.

(51) Int. Cl.
*G06Q 40/00* (2006.01)

(52) U.S. Cl.
USPC .......................................................... 705/44

(58) Field of Classification Search
USPC .......................................................... 705/44
See application file for complete search history.

(56) References Cited

U.S. PATENT DOCUMENTS

2007/0028095 A1 2/2007 Allen et al.
2007/0255662 A1* 11/2007 Tumminaro .................... 705/79
2007/0260556 A1 11/2007 Pousti
2009/0070257 A1* 3/2009 Csoka ............................ 705/39
2010/0082470 A1* 4/2010 Walach et al. ................. 705/35

FOREIGN PATENT DOCUMENTS

WO WO 2005-079254 9/2005

OTHER PUBLICATIONS

International Search Report for PCT/US2011/053279, issued Apr. 18, 2012.

* cited by examiner

*Primary Examiner* — Daniel Felten
*Assistant Examiner* — Clifford Madamba
(74) *Attorney, Agent, or Firm* — King & Spalding LLP

(57) ABSTRACT

This invention provides a system and method for reducing the fraud related to remittance transactions initiated at web portals. In one embodiment, mobile technologies that are available to consumers can be used to reduce fraud associated with remittance transactions. For example, a funding agency computer that enables a remittance transaction can request that a mobile platform computer verify a customer with a mobile personal identifier. The mobile platform computer can request the mobile personal identifier from a customer via the customer's mobile handset device. The mobile platform computer can determine whether the identifier received from the customer's mobile handset device matches the mobile personal identifier stored for the customer. If the mobile platform computer is able to verify the customer, the mobile platform computer can provide a verification confirmation message to the funding agency computer.

11 Claims, 14 Drawing Sheets

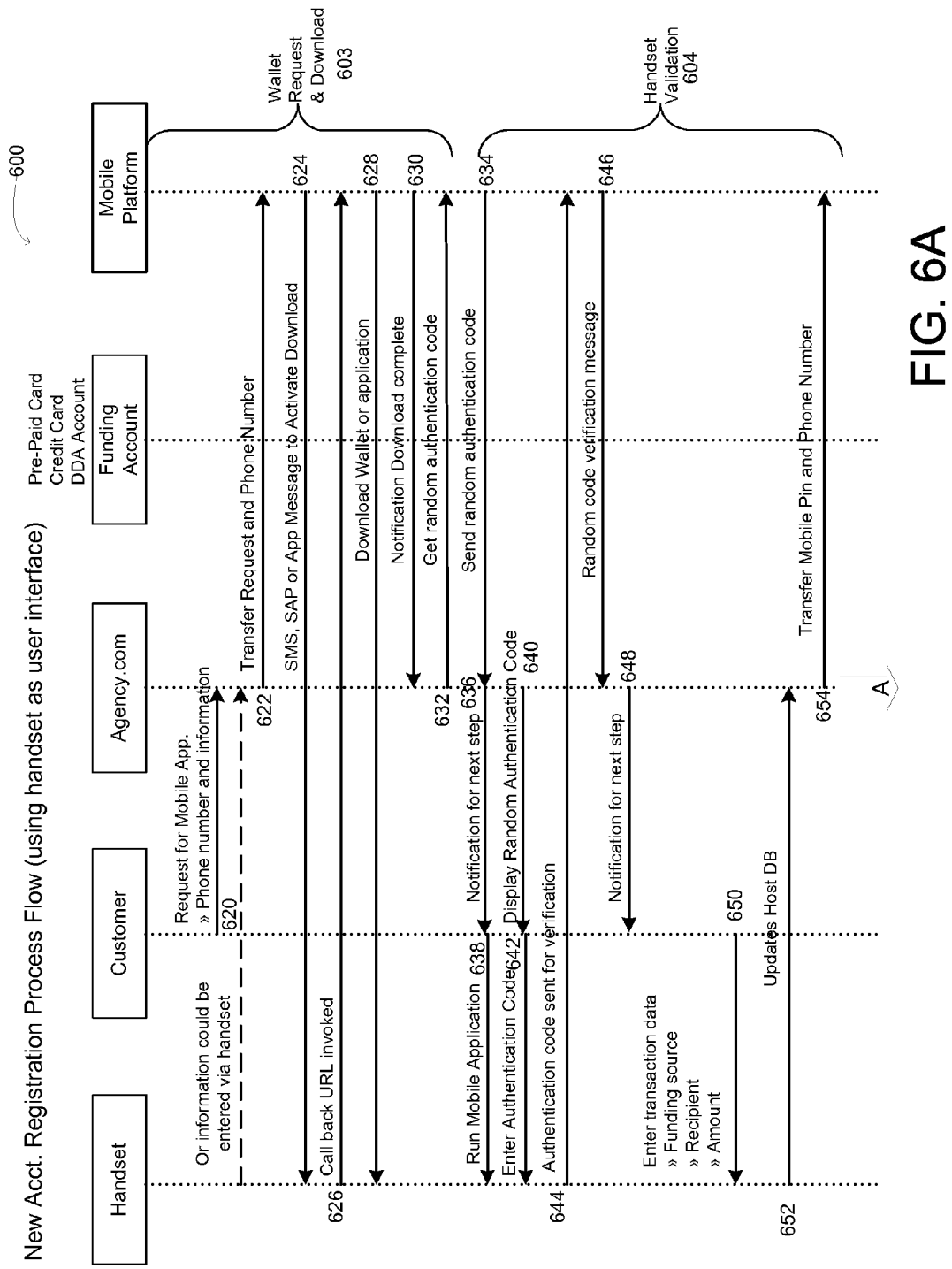

METHOD AND SYSTEM FOR SECURE MOBILE REMITTANCE

RELATED APPLICATION

This application claims the benefit of priority of U.S. provisional patent application Ser. No. 61/386,320, titled "Method and System for Secure Mobile Remittance," filed on Sep. 24, 2010, which is relied on and incorporated herein by reference in its entirety.

COPYRIGHT NOTICE

A portion of the disclosure of this patent document may contain material which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

FIELD OF THE INVENTION

This invention relates to a system and method for securely initiating remittance transactions, also known as "send money" transactions.

BACKGROUND OF THE INVENTION

Current methods for initiating remittance transactions rely on web interfaces provided by the major funds transfer agencies such as Western Union and MoneyGram International. There are known shortcomings and limitations related to current remittance processes. In particular, the funds transfer agencies themselves are plagued with a high degree of fraud related to remittance transactions that are initiated at their public web portals. For example, a credit card number can be used as the funding source for the remittance transaction. However, after the transaction is complete and funds have been redeemed, the funding of the transaction can be challenged by the cardholder using a "charge back" to the card issuing bank.

Accordingly, there is a need for an improved method and system for accomplishing remittance transactions. In particular, there is a need for a remittance method and system that reduces fraud.

SUMMARY OF THE INVENTION

The invention satisfies the above-described and other related needs by providing an improved method and system for reducing fraud in connection with remittance transactions.

In one exemplary embodiment, the invention comprises a computer-implemented method for processing a remittance transaction whereby a mobile platform computer receives from a funding agency computer a verification request associated with a remittance transaction. The verification request can include an identifier such as the customer's mobile telephone number or another identifier of the customer's mobile handset device. The mobile platform computer can transmit a request for a mobile personal identifier, such as a mobile PIN, to the mobile handset. The mobile platform computer can receive an identifier from the mobile handset and determine whether the received identifier matches the mobile personal identifier stored at the mobile platform computer. Lastly, once it is determined that there is a match, the mobile platform computer can notify the funding agency computer that the customer using the mobile handset has been verified.

In another exemplary embodiment, the invention comprises a computer-implemented method for processing a remittance transaction whereby a mobile software application is downloaded to the mobile handset device. After the mobile software application is downloaded to the mobile handset device, a mobile platform computer receives from a funding agency computer a verification request associated with a remittance transaction. The verification request can include an identifier such as the customer's mobile telephone number or another identifier for the customer's mobile handset device. The mobile platform computer can transmit a request for a mobile personal identifier, such as a mobile PIN, to the mobile handset. The mobile platform computer can receive an identifier from the mobile handset and determine whether the received identifier matches the mobile personal identifier stored at the mobile platform computer. Lastly, once it is determined that there is a match, the mobile platform computer can notify the funding agency computer that the customer using the mobile handset has been verified.

In yet another exemplary embodiment, the invention comprises a computer-implemented method for processing a remittance transaction whereby a mobile platform computer receives registration data and secure element data from a mobile handset device. The mobile platform computer transmits credit card provisioning data to the mobile handset device. The mobile platform computer receives from a funding agency computer a verification request associated with a remittance transaction. The verification request can include an identifier such as the customer's mobile telephone number or another identifier for the customer's mobile handset device. The mobile platform computer can transmit a request for a mobile personal identifier, such as a mobile PIN, to the mobile handset. The mobile platform computer can receive an identifier from the mobile handset and determine whether the received identifier matches the mobile personal identifier stored at the mobile platform computer. Lastly, once it is determined that there is a match, the mobile platform computer can notify the funding agency computer that the customer using the mobile handset has been verified.

These and other embodiments of the invention will be described in the detailed description and accompanying drawings that follow.

BRIEF DESCRIPTION OF THE DRAWINGS

FIGS. 6A and 6B illustrate a process for registering a new account for remittance transactions using a mobile application in accordance with an exemplary embodiment of the invention.

DETAILED DESCRIPTION OF THE EXEMPLARY EMBODIMENTS

The present invention answers the foregoing limitations and needs by providing several approaches for systems and methods to permit more reliable remittance transactions. This invention provides a system and method for reducing the fraud related to funding such transactions from web portals by using mobile technologies that are available to consumers and currently being implemented in major consumer markets. As used herein, the term "remittance" refers to the transfer of funds from a sending party to a receiving party, where the receiving party may be located in the same country or a different country from the sending party.

Figure 1:
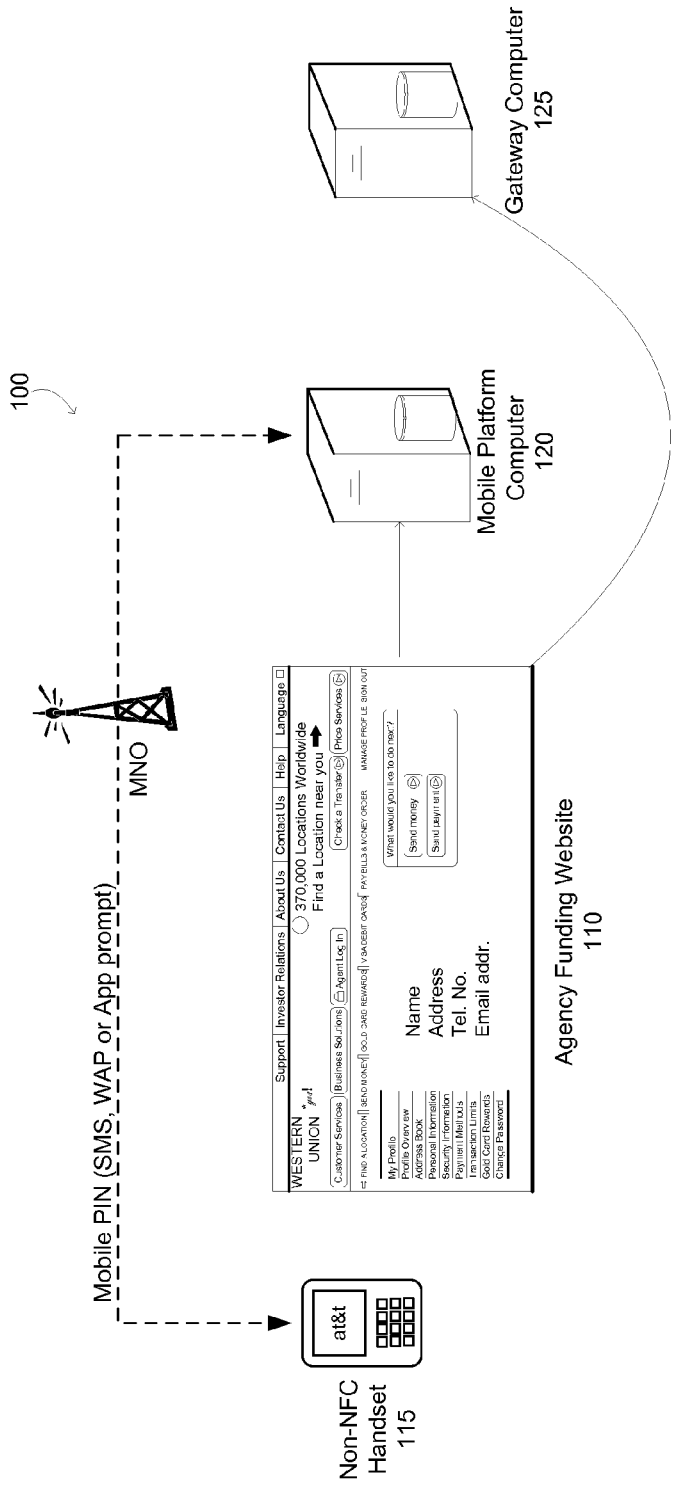
FIG. 1 illustrates an overview of an operating environment in accordance with an exemplary embodiment of the invention

Referring now to FIG. 1, an exemplary environment 100 is illustrated for authenticating a party attempting to transmit funds to another party via website 110. As shown in the exemplary environment 100, a party can initiate a remittance by directing a browser on a personal computer to the website 110 hosted by a funding agency computer. At the website 110, the party can enter personal information and select options for a remittance. Upon receiving a request to initiate a remittance, the funding agency computer can contact the mobile platform computer 120 in order to verify the identity of the party initiating the remittance transaction. The mobile platform computer 120 can access a previously stored mobile PIN for the party and perform a verification process to confirm the identity of the party initiating the remittance transaction.

The party operating mobile handset 115 can receive a prompt from the mobile platform computer 120. In the preferred embodiment, the mobile platform computer 120 is designed to enroll users who want to conduct remittance transactions. The mobile platform computer 120 can register the user's mobile handset 115, store the user's mobile PIN, and communicate with the user's mobile handset 115 in order to verify the user. In more complex embodiments of the invention, the mobile platform computer 120 can comprise a server for hosting a trusted service manager ("TSM") for downloading account information to a secure element component of the mobile handset 115. In other embodiments, the mobile platform computer 120 also can comprise a server for downloading mobile wallet applications and other e-commerce applications to the mobile handset 115.

The prompt the mobile platform 120 sends to the mobile handset 115 can be sent via a variety of techniques, including, for example, via an SMS message or via a prompt to an application installed on the mobile handset 115. In response to the prompt, the party can transmit the mobile PIN to the mobile platform computer 120 for verification. Once the party has been verified, the funds transfer agency can proceed with the remittance transaction by sending payment instructions to a gateway computer 125. In alternate embodiments of the invention, an acquirer computer can take the place of the gateway computer 125. The gateway computer 125 is defined herein as an intermediary computer that is often involved in processing payment transactions. The gateway computer 125 can examine the account number associated with the transaction to determine how to route the transaction. For example, the gateway computer 125 can transmit the transaction to an acquirer computer or directly to a payment network or other financial institution network. The gateway computer also can provide other services such as fraud controls, support for recurring payments, online reporting, and virtual terminal data entry. In certain embodiments, a single entity or single computer provides both the gateway computer and the acquirer computer.

It should be understood that FIG. 1 is merely an overview of an exemplary embodiment of the invention. Additional exemplary embodiments and further details concerning those embodiments are illustrated in the other figures and will be described in more detail in the description that follows. Those of skill in the art will appreciate that components similar to those described in connection with FIG. 1 can be implemented in the embodiments shown and described in the remaining figures and text. Likewise, certain components shown and described in the other exemplary embodiments herein can be substituted or combined to create other embodiments encompassed by the claims. Those of skill in the art will appreciate that the embodiments described herein are merely illustrative and are not limiting.

Figure 2:
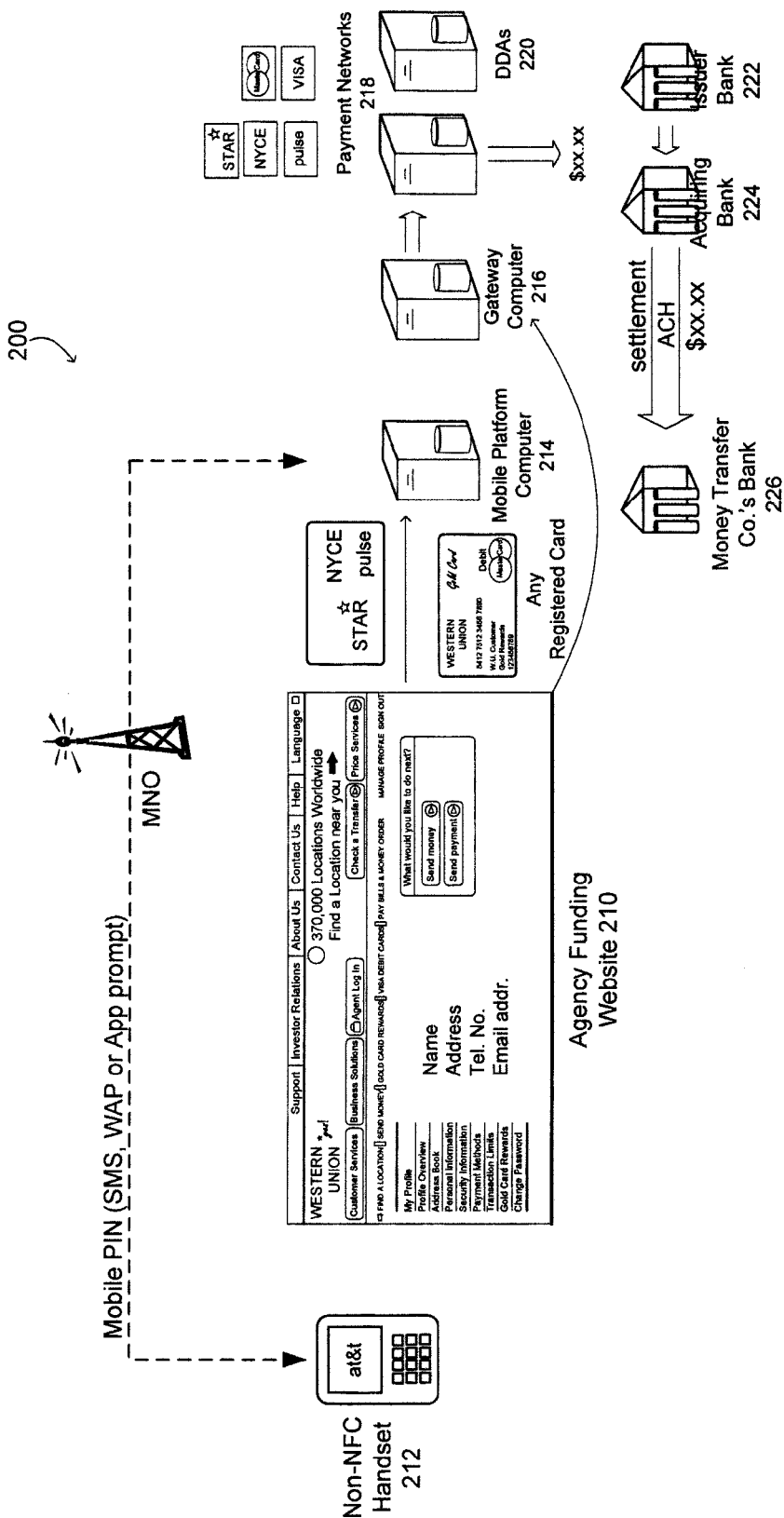
FIG. 2 illustrates an overview of an operating environment for on-line remittances in accordance with an exemplary embodiment of the invention.

Referring to FIG. 2, an exemplary environment 200 for authenticating a remittance transaction is shown in greater detail. Similar to the process described in FIG. 1, a user can initiate a remittance transaction at a website 210 of a funding agency. The user enters personal information and makes selections about the type of remittance transaction that is desired. The request for a remittance transaction causes the funding agency to send a verification request to the mobile platform computer 214. As described above, the mobile platform computer 214 can verify the identity of the user by sending a prompt to the user's mobile device for a mobile PIN. The user would typically provide the mobile PIN to the mobile platform computer 214 as part of an initial enrollment process. Once the user is authenticated with the mobile PIN, the funding agency can proceed with the remittance transaction.

As shown in the exemplary environment, the use of the mobile PIN enables alternate sources of funding for the remittance transaction. For example, the user could request that the funds for the remittance transaction be drawn from a credit account, a debit account, or a checking account. The gateway computer 216 can transmit the transaction to the appropriate payment network 218 or financial institution associated with a demand deposit account 220 based on the source of funding selected by the user. The bank 222 corresponding with the user's selected account can then settle the transaction with the bank 226 of the funding agency. In one example, the settlement between the user's bank 222 and the funding agency's bank 226 can occur via an acquiring bank 224 and an ACH network.

Figure 3:
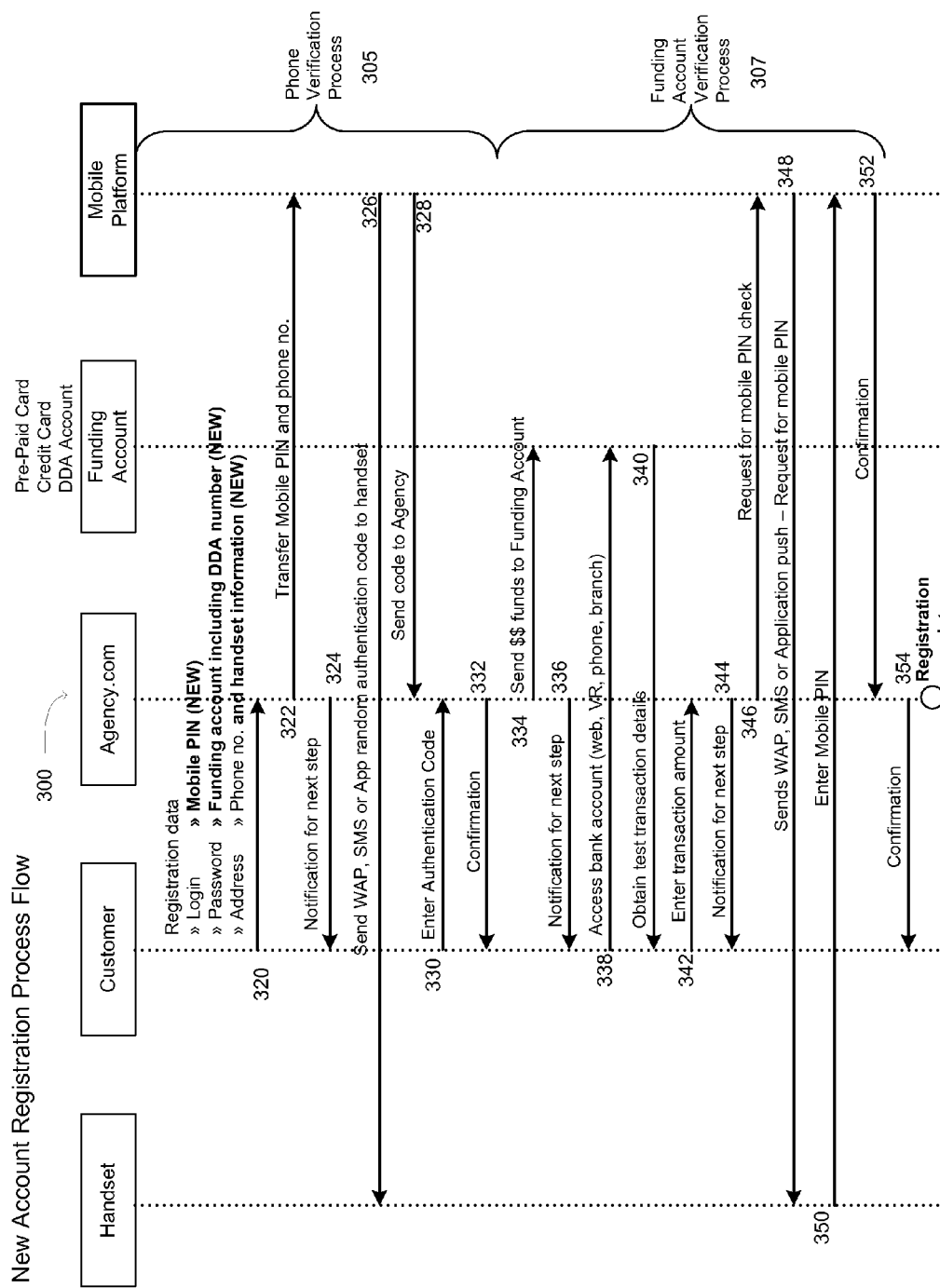
FIG. 3 illustrates a process for registering a new account for remittance transactions in accordance with an exemplary embodiment of the invention.

Referring to FIG. 3, an exemplary process 300 is shown for registering a new account for performing remittance transactions. The process 300 comprises a mobile handset verification process 305 and a funding account verification process 307. The mobile handset verification process 305 begins at step 320 with a customer entering registration data at the funding agency's website. The registration data entered at the funding agency's website can include the customer's login identifier, password, address, funding account number, mobile PIN, mobile telephone number, and handset identifying information (e.g. manufacturer or model information). In alternate embodiments of the invention, the registration data can include a different set of identifying information. In step 322, the funding agency's computer that receives the registration data can transmit the customer's mobile PIN and mobile telephone number to the mobile platform computer.

In step 324, the funding agency's computer notifies the customer of the next step and, in step 326, the mobile platform computer transmits a random authentication code to the mobile handset for entry by the customer in step 330. The mobile platform computer also transmits the random authentication code to the funding agency's computer in step 328 so that the funding agency computer can verify the random authentication code and provide the customer with a confirmation in step 332.

In step 334, the process for verifying the funding account begins with the funding agency computer transferring a nominal amount of funds, such as a few cents, to the funding account as a test. In step 336, the funding agency computer prompts to the customer to access the funding account to identify the amount of the nominal funds transferred by the funding agency computer and to enter the amount of the nominal funds transferred at the website hosted by the funding agency computer as illustrated in steps 338, 340 and 342. The foregoing steps serve as a method for verifying that the customer has provided the correct funding account.

Lastly, in steps 346, 348, and 350, the customer's mobile PIN is verified by requesting the customer to enter the mobile PIN on their mobile handset device and confirming that the received mobile PIN matches the mobile PIN stored at the mobile platform computer. Once a match is established, confirmation notices are sent to the funding agency computer and the customer at steps 352 and 354. After step 354, the registration process is complete. Those skilled in the art will appreciate that the steps illustrated in exemplary process 300 may be modified to accomplish the same purpose.

Figure 4:
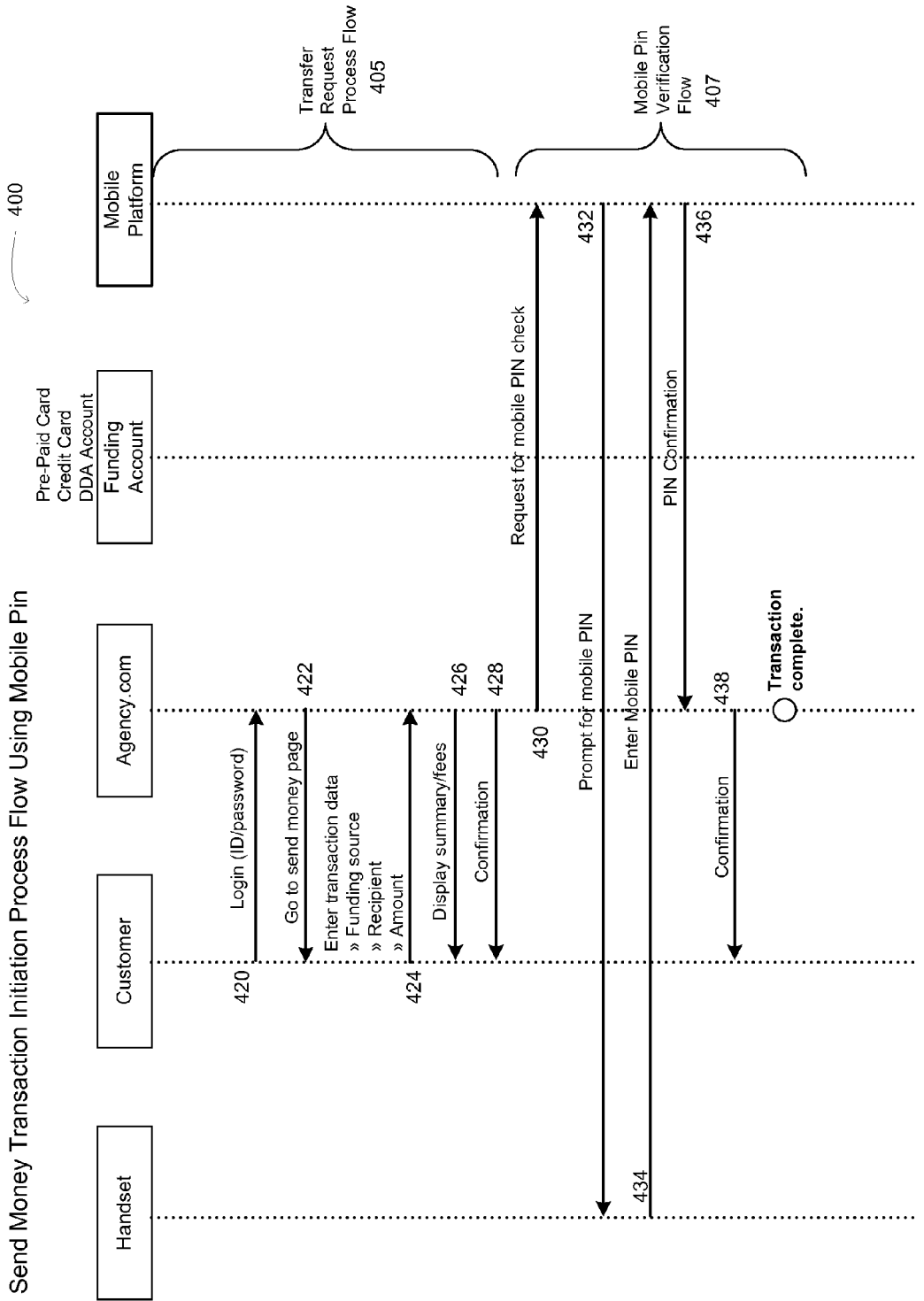
FIG. 4 illustrates a process for initiating a remittance using a mobile PIN in accordance with an exemplary embodiment of the invention.

Referring to FIG. 4, exemplary process 400 illustrates a method for performing a mobile PIN verification in connection with a remittance transaction. Exemplary process 400 comprises a funds transfer request process 405 and a mobile PIN verification process 407. Beginning with the funds transfer request process 405, in step 420, the customer enters a login ID and password at the website hosted by the funding agency computer. After the customer's login is verified, the customer is directed to a remittance transaction webpage in step 422 and the customer enters the transaction data in step 424. In step 426, the funding agency computer displays a webpage summarizing the requested remittance transaction and the associated fees.

Next, the mobile PIN verification process 407 is performed. In step 430, the funding agency computer transmits a verification request to the mobile platform computer. Typically, the verification request includes identifying information such as the customer's mobile telephone number or another identifier associated with the mobile handset. In step 432, the mobile platform computer transmits a request to the customer's mobile handset for the customer's mobile personal identifier. Upon receipt of the identifier from the customer's mobile handset in step 434, the mobile platform computer compares the received identifier against the customer's mobile personal identifier that was provided during the registration process 300 to ensure the customer has provided the correct mobile personal identifier.

Upon confirming that the correct mobile personal identifier has been received from the customer, the mobile platform computer transmits a verification confirmation message to the agency funding computer in step 436. In step 438, the funding agency computer can send the customer a confirmation notice via the website that the customer has been verified and that the remittance transaction can proceed. Exemplary process 400 is merely one example of using a mobile device to assist with improving security with respect remittance transactions. Other exemplary embodiments of the invention will be described below.

Figure 5:
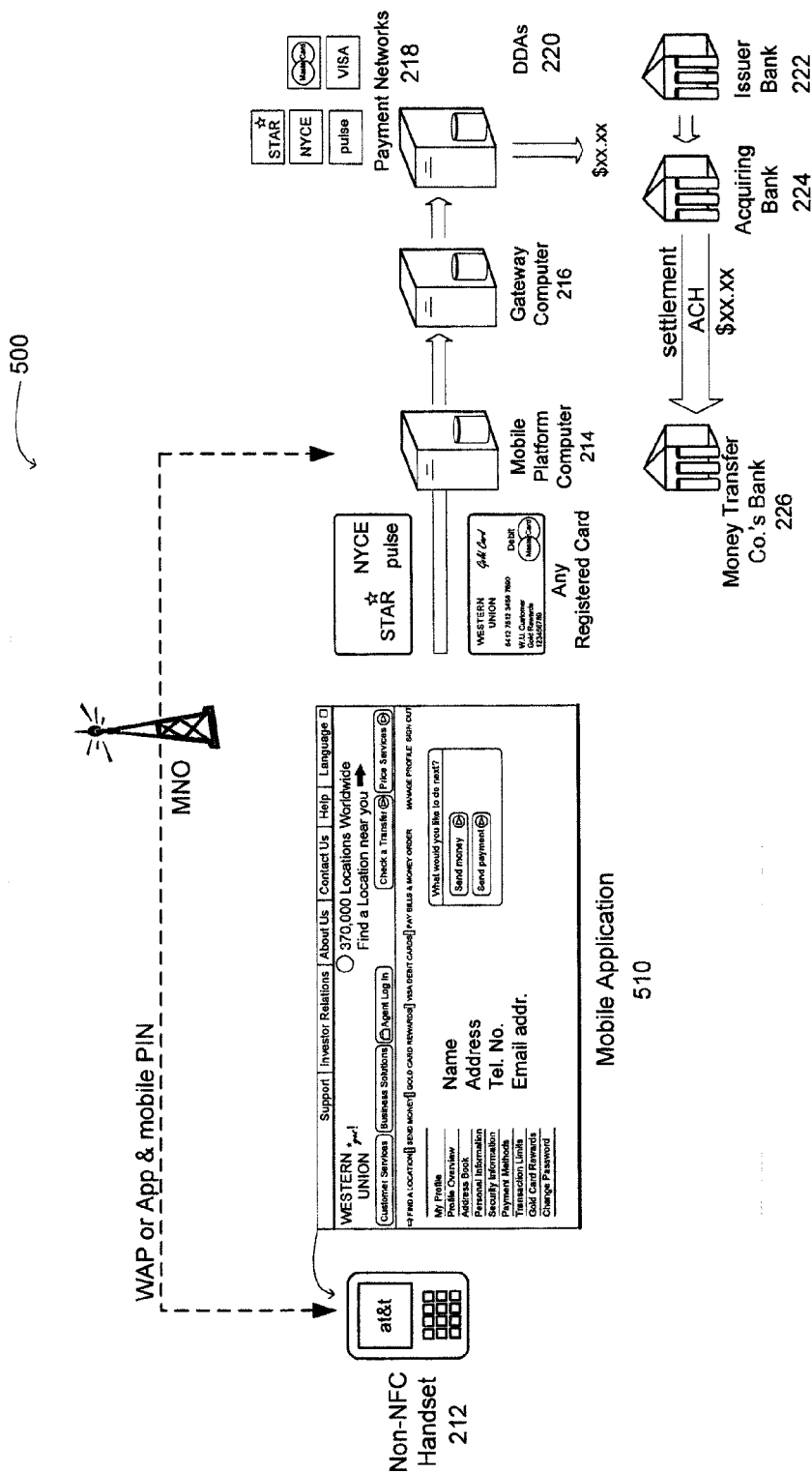
FIG. 5 illustrates an operating environment for a remittance transaction in accordance with an exemplary embodiment of the invention.

Referring to FIG. 5, exemplary environment 500 is illustrated for conducting a remittance transaction. The components illustrated in FIG. 5 are largely the same as those illustrated in FIG. 2 except that the components in FIG. 5 are used in a different manner to perform the remittance transaction. Specifically, environment 500 is different from environment 200 in that the customer interacts with the funding agency computer via the mobile handset 212. This interaction can be accomplished in a variety of ways including an application provided by the funding agency that is loaded onto the mobile handset 212 or via a WAP presentation page that the funding agency computer provides to the browser o the mobile handset 212. The remaining components illustrated in FIG. 5 are the same as the components illustrated in FIG. 2.

Figure 6B:
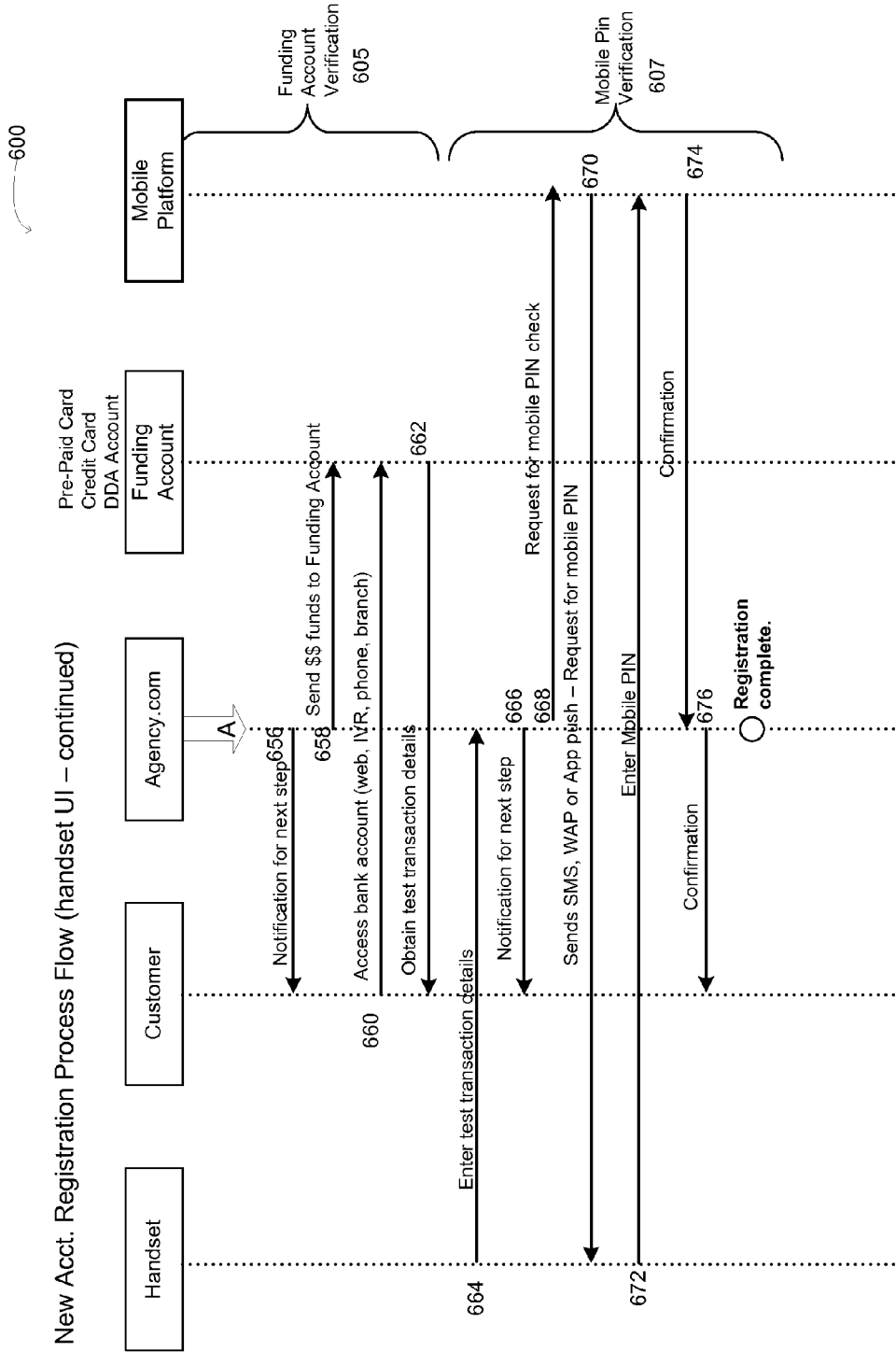

Turning to FIGS. 6A and 6B, exemplary process 600 describes a registration process for the environment illustrated in FIG. 5 where the customer interacts with the funding agency computer via the mobile handset. Exemplary registration process 600 comprises the following sub-processes: a wallet request and download process 603, a handset validation process 604, a funding account verification process 605, and a mobile PIN verification process 607. Those of skill in the art will appreciate that the steps of exemplary process 600 are illustrative and in alternate embodiments of the invention, certain steps may be performed in a different sequence or removed entirely.

Referring to step 620, the customer can submit a request to download a mobile application, such as a mobile wallet, to the customer's mobile handset. The request can be submitted to the funding agency computer via a website or via the customer's mobile handset (as indicated by the dotted line). The funding agency computer, in step 622, transfers the request for the mobile application to the mobile platform computer, which in turn transmits a message to the customer's mobile handset in order to perform the download in step 624. For example, the customer's mobile handset can receive a call-back URL, as shown in step 626, which, when selected initiates the download of the mobile wallet in step 628. Once the download of the mobile wallet to the mobile handset is complete, a notification message can be sent from the mobile platform computer to the funding agency computer in step 630. The completion of step 630 completes the exemplary wallet request and download sub-process 603.

Referring now to the mobile handset validation sub-process 604, in step 632, the funding agency computer can request a random authentication code from the mobile platform computer. The mobile platform computer returns the random authentication code in step 634. In steps 636 and 638, the customer is notified of the validation sub-process and runs the mobile application on the mobile handset. In steps 640 and 642, the customer receives the random authentication code on the mobile handset and enters the same code into the mobile application running on the mobile handset so that the code can be returned to the mobile platform computer in step

646. In step 648, the mobile platform computer notifies the funding agency computer that the random authentication code has been received so that the mobile handset has been validated. In alternate embodiments of the invention, the foregoing steps of the mobile handset validation sub-process can be omitted because the mobile handset can be identified during the mobile wallet download sub-process.

Referring now to steps 648 and 650, the customer is prompted to enter information to identify the account the customer intends to use as the funding source for remittance transactions. In step 650, the customer can also enter other information such as a mobile personal identifier. The information entered in step 650 can be forwarded to the funding agency computer in step 652 and the funding agency computer can forward the mobile personal identifier and the customer's mobile handset number for storing at the mobile platform computer in step 654.

Exemplary process 600 continues in FIG. 6B where the funding agency computer can perform the steps associated with the funding account verification sub-process 605. Steps 656, 658, 660, 662 and 664 are similar to the funding account verification process described previously in connection with FIG. 3. The primary difference in the funding account verification sub-process 605 is that the customer enters the test transaction amount on the mobile handset instead of at the website hosted by the funding agency computer. Likewise, steps 666, 668, 670, 672, 674 and 676 are similar to verification steps 344 through 354 described previously in connection with FIG. 3. Therefore, the discussion of these steps will not be repeated here.

Figure 7:
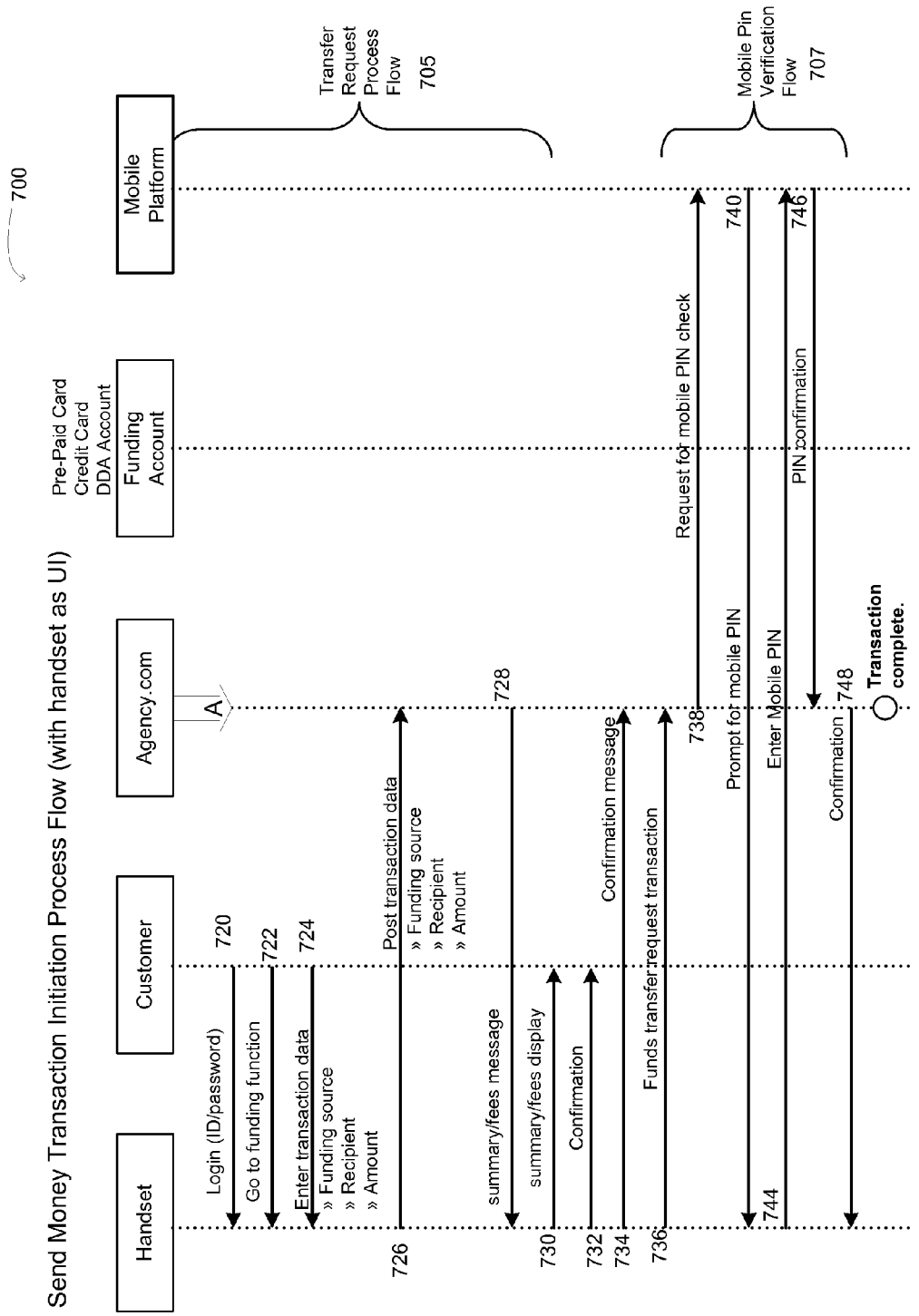
FIG. 7 illustrates a process for initiating a remittance using a mobile application in accordance with an exemplary embodiment of the invention.

Referring to FIG. 7, an exemplary process 700 is illustrated for initiating a remittance transaction using a mobile personal identifier verification procedure. Exemplary process 700 comprises a transfer request sub-process 705 and a mobile personal identifier verification process 707. The transfer request sub-process 705 is similar to the transfer request sub-process 405 of FIG. 4. The primary difference in sub-process 705 is that the customer is entering the transaction data in step 726 using the mobile application on the mobile handset and the mobile handset communicates the transaction data to the funding agency computer in step 726. In steps 728 and 730 the funding agency computer provides a summary of the transaction and the associated fees to the customer via the customer's mobile handset. In steps 732 and 734 the customer and the funding agency computer exchange a confirmation via the mobile handset and in step 736 the customer proceeds with the remittance transaction via the mobile handset.

Referring now to the mobile personal identifier verification sub-process 707, the steps are similar to those performed in sub-process 407 in FIG. 4. Accordingly, there is no need to repeat the discussion of the mobile personal identifier verification sub-process here. It will be appreciated that alternate embodiments of the invention may perform the steps of exemplary process 700 in a different fashion or may omit steps entirely.

Figure 8:
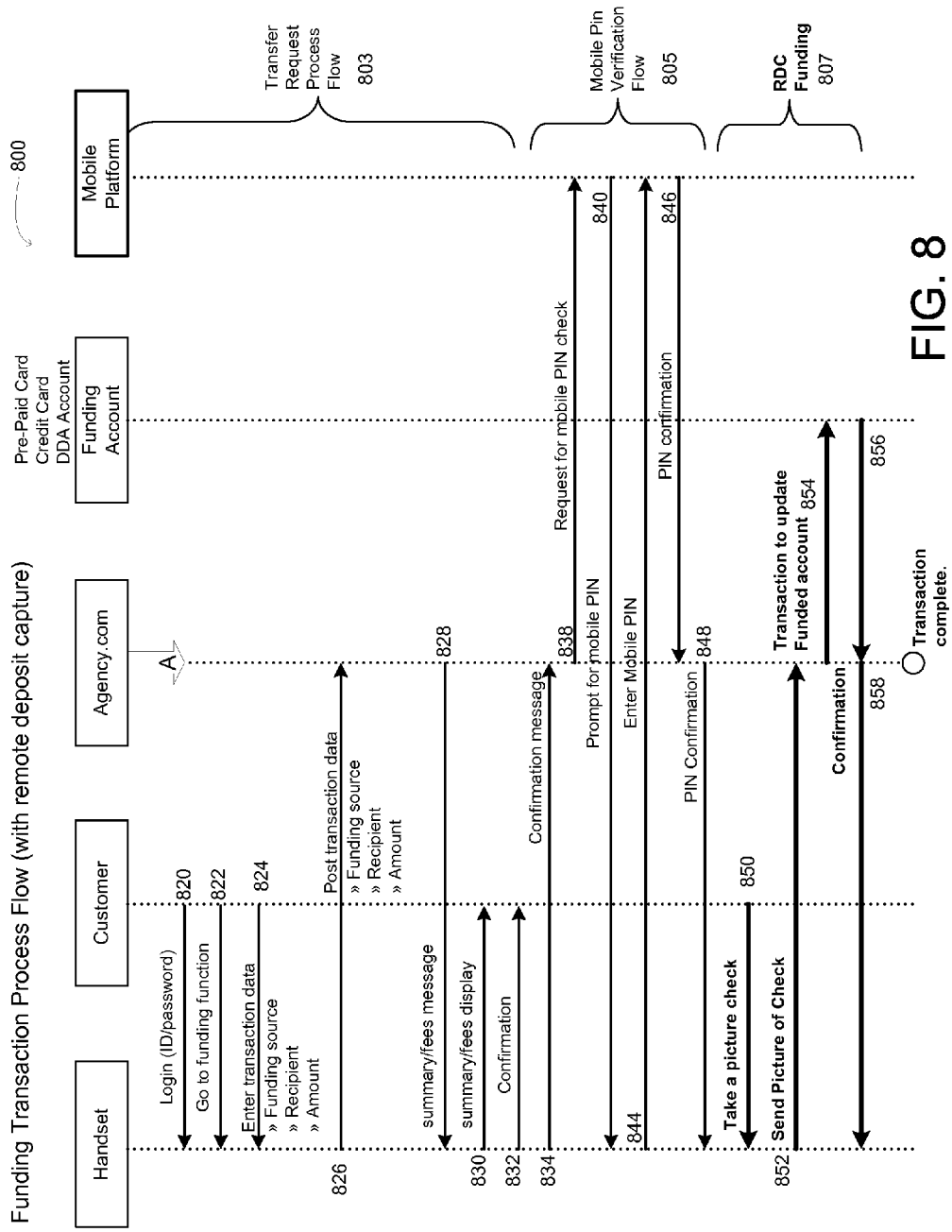
FIG. 8 illustrates a process for funding a remittance transaction in accordance with an exemplary embodiment of the invention.

Referring to FIG. 8, an exemplary process 800 is illustrated for performing a remittance transaction that includes a remote deposit capture. Exemplary process 800 comprises the following exemplary sub-processes: a transfer request process 803, a mobile personal identifier verification process 805, and a remote deposit capture process 807. The exemplary transfer request sub-process 803 is similar to the transfer request sub-process 705 of FIG. 7. One difference in sub-process 803 of FIG. 8 is that in step 824, the user designates as the funding source the checking account on which the check referenced in step 850 is drawn. For example, the customer can write a check drawn on the customer's own checking account and the customer would designate his/her own checking account as the funding account. Alternatively, in another example, the customer can deposit a paycheck from an employer in the remote deposit capture sub-process 807. In that situation, the customer can designate the employer's account on which the check is drawn as the funding account in step 824. In yet other embodiments, the customer may designate other accounts as the funding source.

Referring now to the exemplary mobile personal identifier verification sub-process 805, the steps are similar to those performed in sub-process 407 in FIG. 4 and sub-process 707 in FIG. 7. Accordingly, there is no need to repeat the discussion of the mobile personal identifier verification sub-process here. It will be appreciated that alternate embodiments of the invention may perform the steps of exemplary sub-process 805 in a different fashion.

Turning to the exemplary remote deposit capture sub-process 807, the customer can take a photograph of a check in step 850. Typically, the check will be drawn on an account that was previously designated as the funding source for the remittance transaction. In step 852, the photograph of the check is transmitted from the mobile handset device to the funding agency computer. In step 854, the funding agency computer transmits a transaction to the funding account in order to draw the amount of the check from the funding account. The funding agency computer can confirm the requested remittance transaction by validating that the funds are available to the recipient and sending a confirmation message to the funding agency computer in step 856. The funding agency computer can send a confirmation message to the mobile handset device in step 858.

Those skilled in the art will appreciate that alternate embodiments of the invention may use other funding sources instead of a DDA or a check that is deposited remotely. For example, if the customer has downloaded a mobile wallet application to the mobile handset device as described in connection with FIGS. 6A, 6B and 7, the customer may want to use funding sources associated with the mobile wallet application. The mobile wallet application may have gift cards, credit cards, or debit cards associated with it and any one of these funding sources can be used to fund the remittance transaction. The exemplary processes described in FIGS. 6A, 6B, 7 and 8 can be modified to accommodate these other funding sources.

Figure 9:
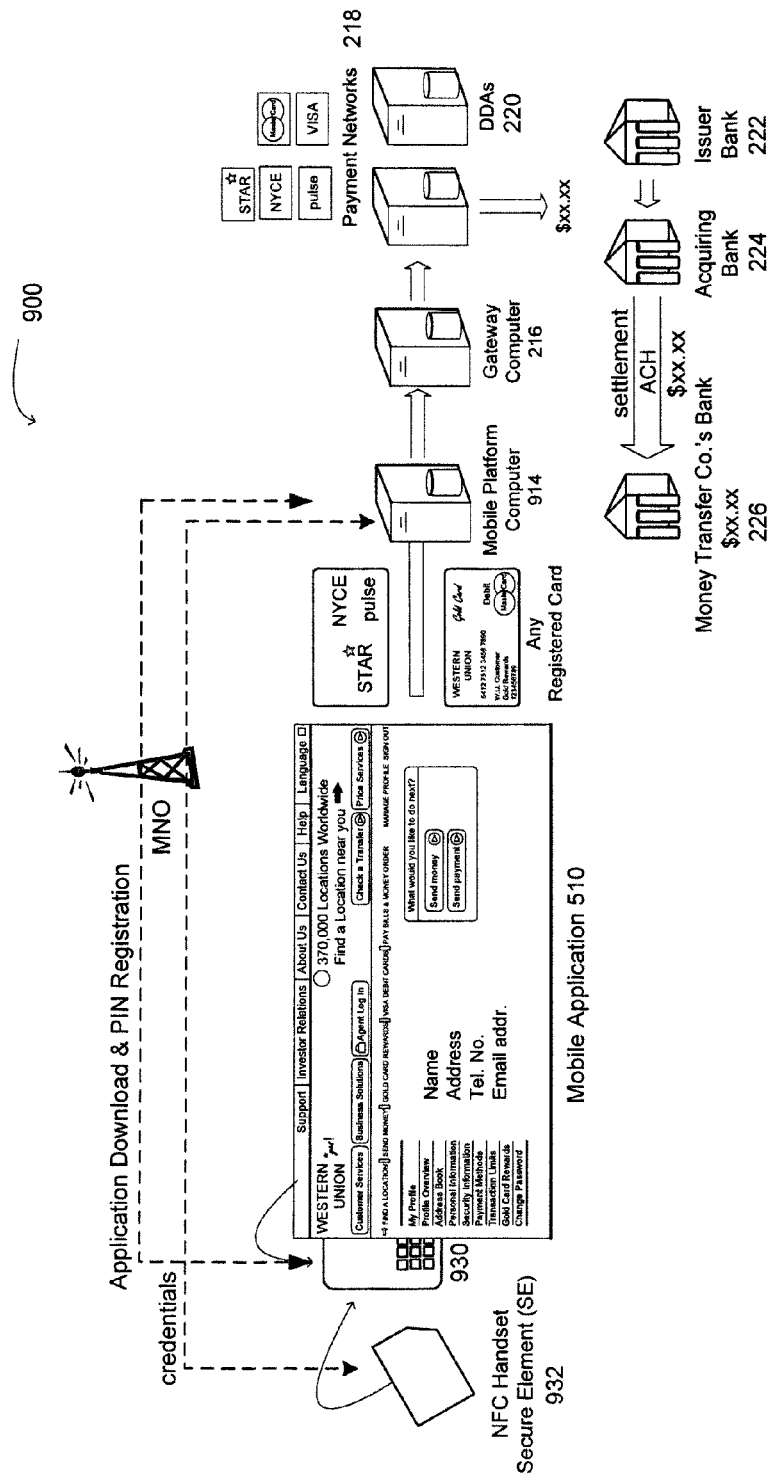
FIG. 9 illustrates an operating environment for a remittance transaction using an NFC-enabled handset in accordance with an exemplary embodiment of the invention.

Referring now to FIG. 9, exemplary environment 900 is illustrated for conducting a remittance transaction using a mobile handset device equipped with an NFC chip operable to securely store credentials related to payment accounts. The components illustrated in FIG. 9 are largely the same as those illustrated in FIG. 2 and FIG. 5, except for the mobile handset device 930 and the mobile platform computer 914. Specifically, the mobile platform computer 914 hosts a trusted service manager ("TSM") for transmitting secure credentials to a secure element 932 of the mobile handset device 930. For example, the TSM can provision an electronic credit card or electronic debit card associated with a mobile wallet software application loaded onto the mobile handset device 930. The remaining components illustrated in FIG. 9 are the same as the components illustrated in FIG. 2 and FIG. 5.

Figure 10A:
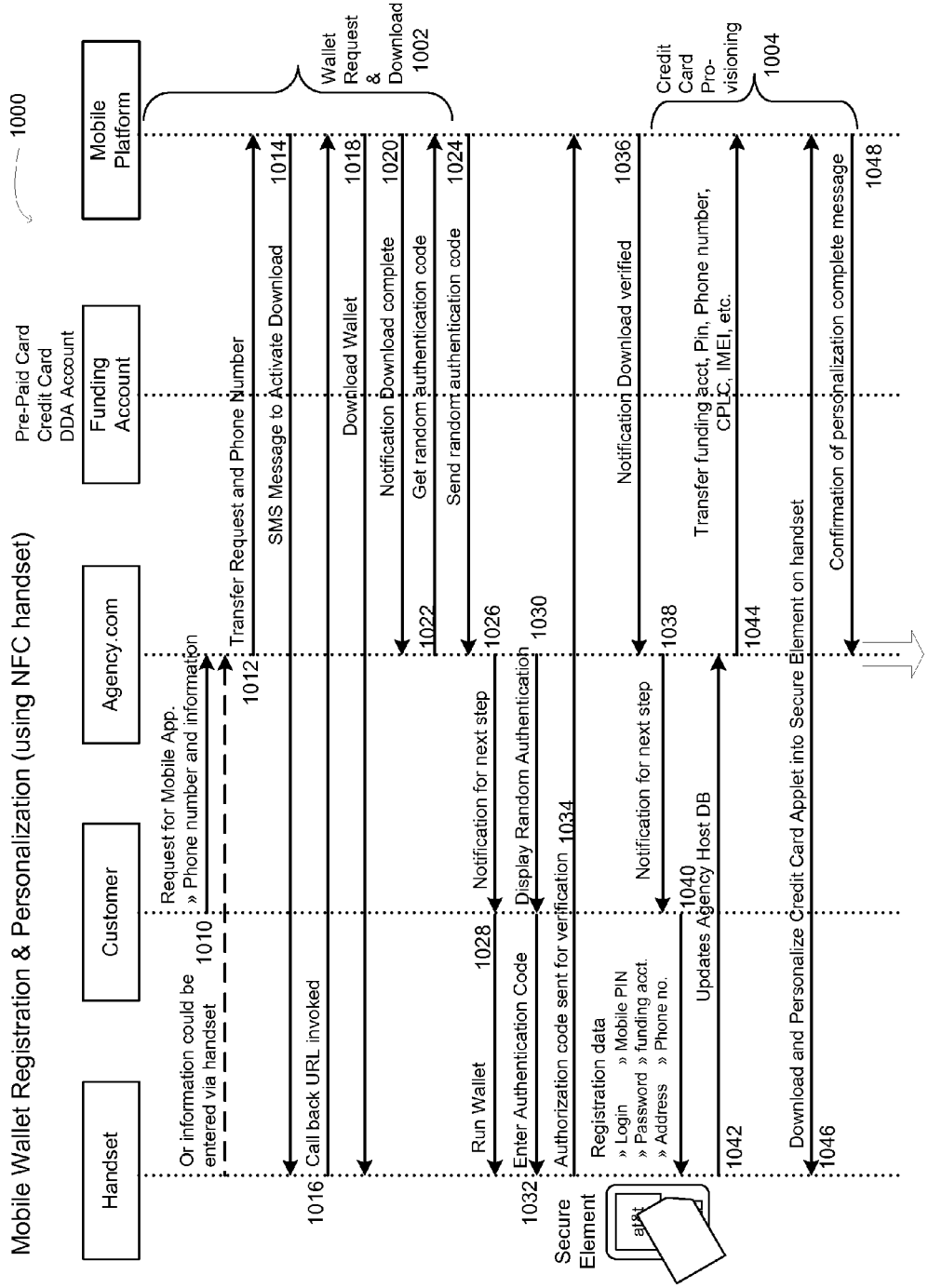
FIGS. 10A and 10B illustrate a process for registering a mobile wallet for use with remittance transactions in accordance with an exemplary embodiment of the invention.
Figure 10B:
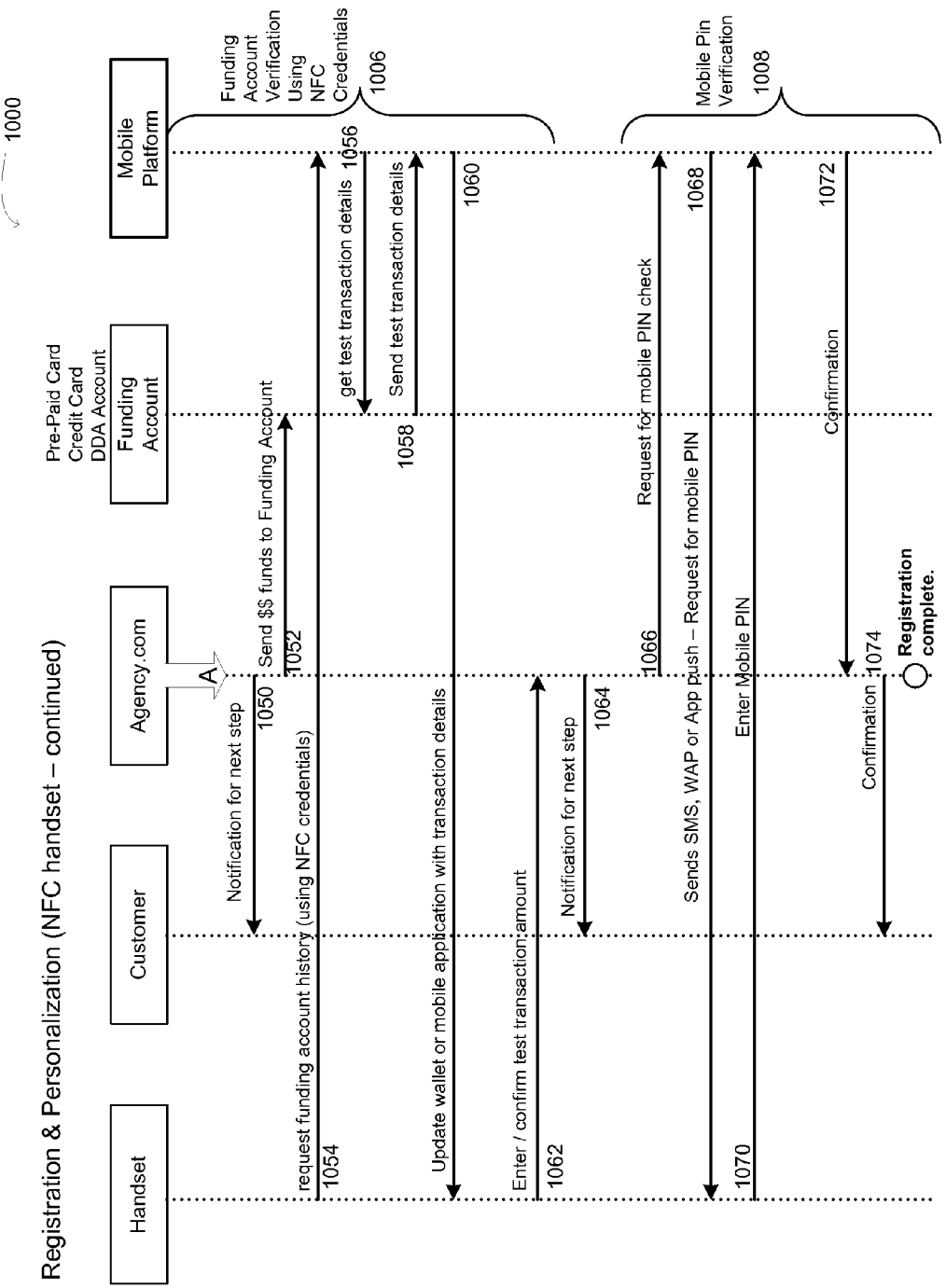

Turning now to FIGS. 10A and 10B, an exemplary process 1000 is illustrated for registering a mobile handset device for use in the exemplary environment illustrated in FIG. 9. Exemplary process 1000 comprises the following exemplary sub-processes: wallet request and download 1002, credit card provisioning 1004, funding account verification using secure element credentials 1006, and mobile personal identifier verification 1008. Those of skill in the art will recognize that not all of the steps illustrated in exemplary process 1000 are necessary to perform the invention. Beginning with the sub-process addressing wallet request and download 1002, this process is the same as sub-process 603 described in connection with exemplary process 600 illustrated in FIG. 6A. Accordingly, we will not repeat the description of this sub-process here because the description above in connection with FIG. 6A can be referenced.

The next exemplary sub-process 1004 concerns provisioning a credit card stored in the secure element of the mobile handset device. In alternate embodiments of the invention, a similar process can be used to provision other types of cards such as debit cards and gift cards. Referring to step 1038, the customer is prompted by the funding agency application or WAP presentation on the mobile handset device that the mobile wallet application has been downloaded and verified. In step 1040, the customer enters registration data concerning the remittance transaction on the mobile handset device. This registration data, or portions thereof, can be stored in the secure element of the mobile handset device. In step 1042, the registration data and other sensitive information from the secure element is transmitted from the mobile handset device to the funding agency computer. Examples of other sensitive information from the secure element include information identifying the mobile handset's operating system and technical specifications identifying the chip set used in the secure element. In step 1044, the funding agency computer forwards the registration data and other sensitive information collected from the mobile handset device to the mobile platform computer. The mobile platform computer can use the information received to provision a credit card or other card stored in the secure element of the mobile handset device in step 1046. The mobile platform computer can also perform other steps to personalize the mobile handset device. Examples of these additional steps include: establishing a secure communication channel between the TSM and the secure element of the mobile handset device; the rotation (replacement) of the default encryption keys on the secure element using the encryption keys of the funding agency; provisioning the required payment card applets into the secure element; and personalizing the payment card applets using the credentials of the card holder and other unique identifiers provided by the issuing institution. The secure manner by which this personalization process is performed can thus be relied upon in subsequent steps of this embodiment as advantageous over other less secure methods of user credential storage. In step 1048, the mobile platform computer confirms to the funding agency computer that the mobile handset has been personalized and the credit card provisioned.

In FIG. 10B, exemplary process 1000 continues with the next sub-process, which is the funding account verification process 1006. Exemplary process 1006 is different from the previous funding account verification process 605 illustrated in FIG. 6B. Exemplary process 1006 in FIG. 10B begins with a notification for the next step (step 1050) and the funding agency computer transmits a test amount of funds, such as a few cents, to the funding account designated by the customer in step 1052. However, now that the mobile platform computer has provisioned and personalized the mobile handset device, the verification process can use the mobile platform computer and the mobile handset device in lieu of traditional channels outlined in process 605 such as communications via the web, IVR, or telephone. For example, in step 1054, the mobile handset, using the credentials which are securely stored on the secure element, requests the funding account history from the mobile platform computer and the mobile platform computer retrieves this information in steps 1056 and 1058. In step 1060, the mobile wallet application on the mobile handset is updated with the funding account information and the customer is able to confirm the test amount of funds with the funding agency computer in step 1062 either with or without the express involvement of the customer. In step 1064, the funding agency computer then notifies the customer, for example via the funding agency's mobile application on the mobile handset, that the verification of the funding account is complete.

The last exemplary sub-process of process 1000 is the verification step 1008 performed with the mobile personal identifier. However, this sub-process 1008 is the same as sub-process 607 described previously in connection with FIG. 6B. Accordingly, the description of this sub-process will not be repeated.

Figure 11:
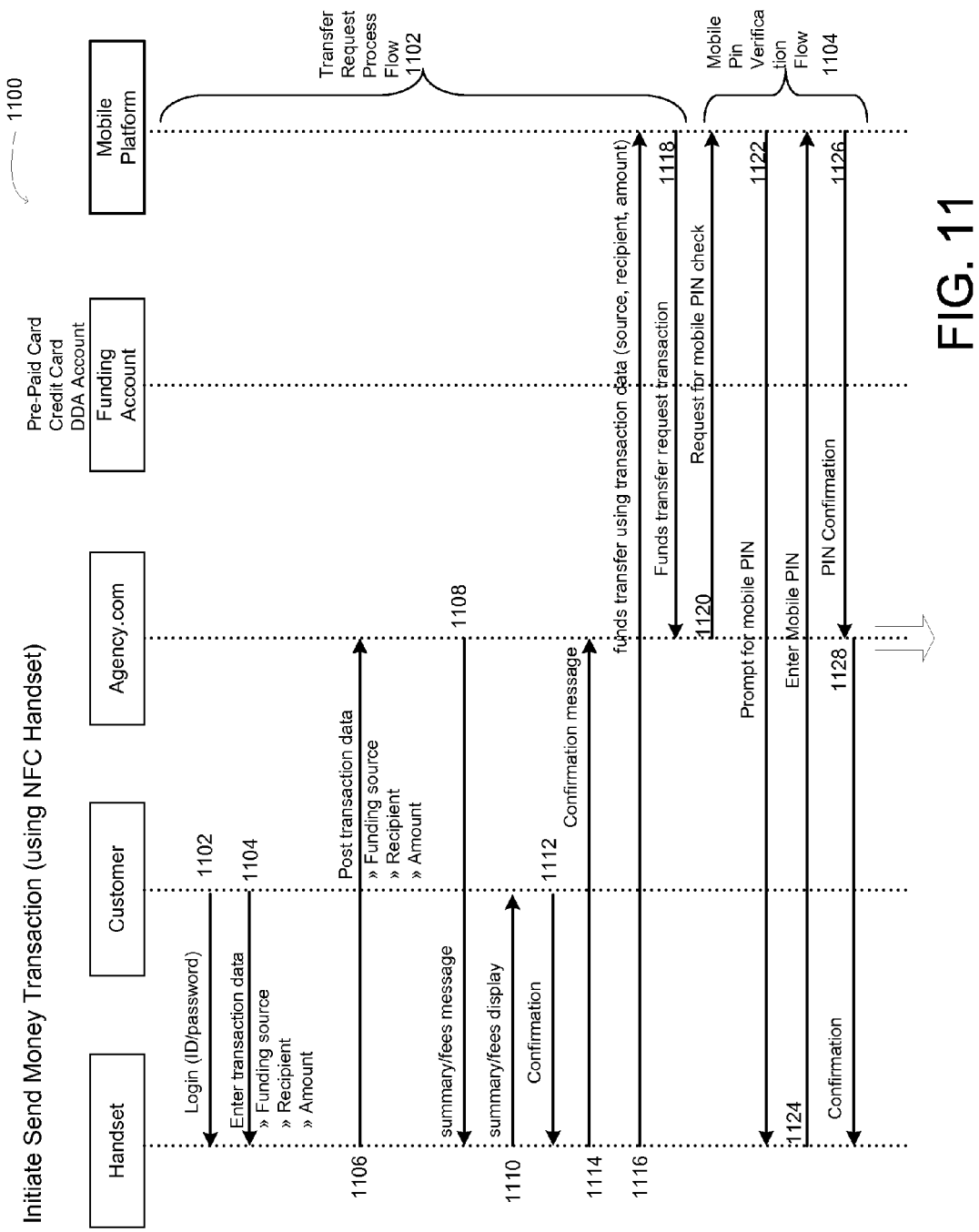
FIG. 11 illustrates a process for initiating a remittance using an NFC-enabled handset in accordance with an exemplary embodiment of the invention.

Once the exemplary registration process 1000 is completed, the customer can initiate a remittance transaction using exemplary process 1100 illustrated in FIG. 11. Exemplary process 1100 comprises a transfer request process 1102 and a mobile personal identifier verification process 1103. In alternate embodiments of the invention certain steps in exemplary process 1100 can be altered or removed.

Beginning with the exemplary transfer request process 1102, the customer logs in and enters transaction data using the mobile handset in steps 1104 and 1105. In step 1106, the mobile handset transmits the transaction data to the funding agency computer. In steps 1108 and 1110, a summary of the transaction and the fees is provided to the mobile handset and displayed to the customer. After the funding agency computer receives a confirmation message in steps 1112 and 1114 that the customer would like to proceed with the transaction, the customer uses the mobile handset to transmit the transaction information to the mobile platform computer in step 1116. The mobile platform computer transmits the remittance transaction to the funding agency computer in step 1118. In this exemplary embodiment, the mobile platform computer is acting as a TSM to authenticate the mobile handset device and payment credentials prior to forwarding the request to the agency and therefore provides a higher level of security than can be achieved in steps 724 through 736 of exemplary process 705.

Before proceeding with the remittance transaction, the funding agency computer will perform the mobile personal identifier verification process 1103 in order to eliminate any potential fraudulent transaction. This verification process 1103 is the same as the previous mobile personal identifier verification processes described in connection with FIG. 7 and FIG. 8. Therefore, the description of the process will not be repeated here. Once the customer's mobile personal identifier is verified, the funding agency will complete the remittance transaction as illustrated in exemplary process 1100.

Although the exemplary embodiments herein are generally described in the context of software modules running on a computing device, those skilled in the art will recognize that the present invention also can be implemented in conjunction with other program modules in other types of computing environments. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description of the exemplary embodiments includes processes and symbolic representations of operations by conventional computer components, including processing units, memory storage devices, display devices and input devices. These processes and symbolic representations are the means used by those skilled in the art of computer programming and computer construction to most effectively convey teachings and discoveries to others skilled in the art. These processes and operations may utilize conventional computer components in a distributed computing environment, including remote file servers, remote computer servers, and remote memory storage devices. Each of these conventional distributed computing components is accessible by a processing unit via a communications network.

The present invention includes computer hardware and software which embody the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer hardware and software will be explained in more detail in the following description in conjunction with the other figures in the application.

Figure 12:
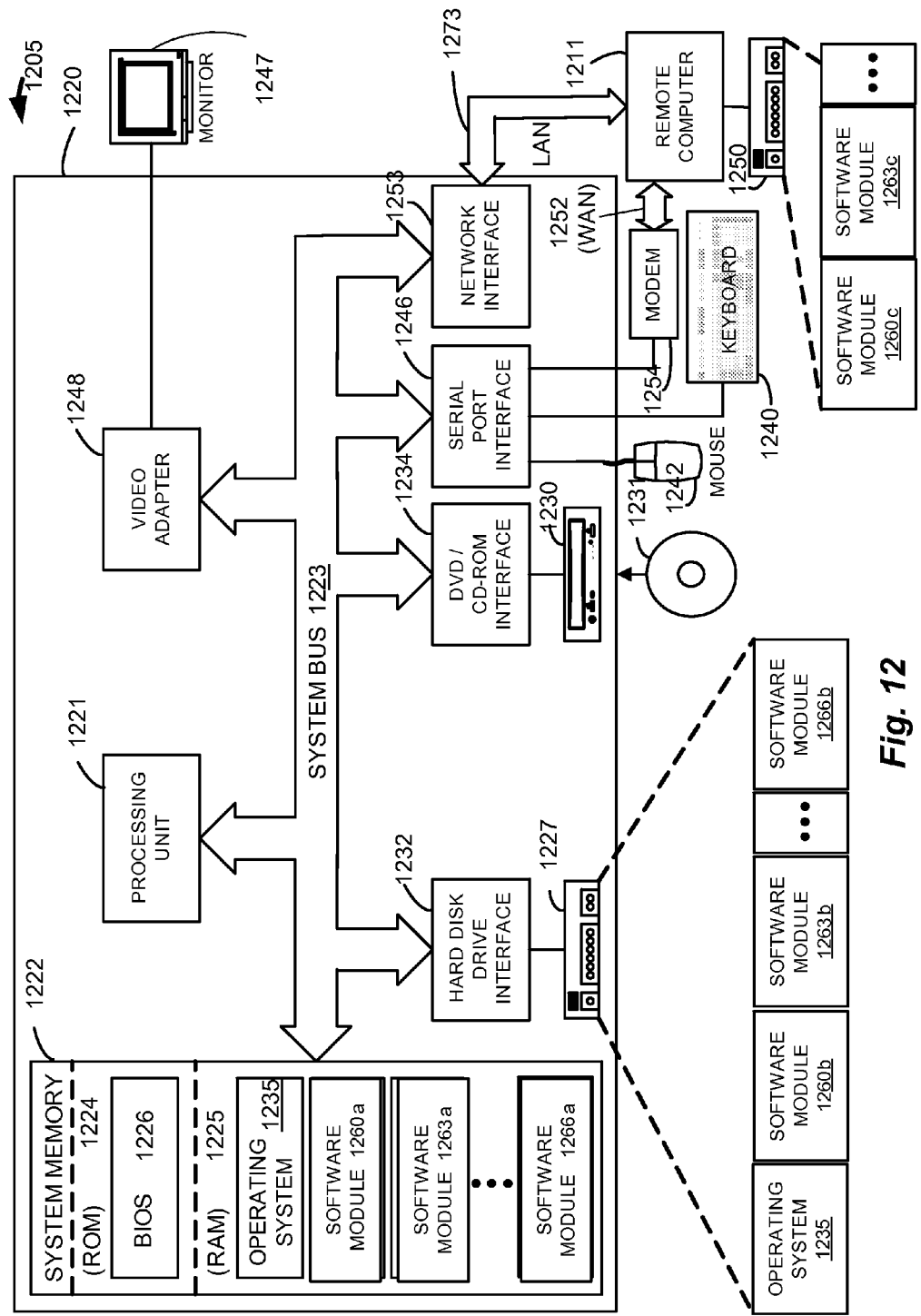
FIG. 12 illustrates the components of an exemplary computing device for use with the preferred embodiment of the invention.

Referring now to FIG. 12, aspects of an exemplary computing environment in which the present invention can operate are further illustrated. Those skilled in the art will appreciate that FIG. 12 and the associated discussion are intended to provide a brief, general description of the preferred computer hardware and program modules, and that additional information is readily available in the appropriate programming manuals, user's guides, and similar publications.

FIG. 12 illustrates a conventional computing device 1220 suitable for supporting the operation of the preferred embodiment of the present invention as illustrated in the previous figures. In FIG. 12, the computing device 1220 operates in a networked environment with logical connections to one or more remote computers 1211. The logical connections between computing device 1220 and remote computer 1211 are represented by a local area network 1273 and a wide area network 1252. Those of ordinary skill in the art will recognize that in this client/server configuration, the remote computer 1211 may function as a remote computing device or remote storage device.

The computing device 1220 includes a processing unit 1221, such as "PENTIUM" microprocessors manufactured by Intel Corporation of Santa Clara, Calif. The computing device 1220 also includes system memory 1222, including read only memory (ROM) 1224 and random access memory (RAM) 1225, which is connected to the processor 1221 by a system bus 1223. The preferred computing device 1220 utilizes a BIOS 1226, which is stored in ROM 1224. Those skilled in the art will recognize that the BIOS 1226 is a set of basic routines that helps to transfer information between elements within the computing device 1220. Those skilled in the art will also appreciate that the present invention may be implemented on computers having other architectures, such as computers that do not use a BIOS, and those that utilize other microprocessors.

Within the computing device 1220, a local hard disk drive 1227 is connected to the system bus 123 via a hard disk drive interface 1232. A floppy disk drive 1228, which is used to read or write a floppy disk 1229, is connected to the system bus 1223 via a floppy disk drive interface 1233. A CD-ROM or DVD drive 1230, which is used to read a CD-ROM or DVD disk 1231, is connected to the system bus 1223 via a CD-ROM or DVD interface 1234. A user enters commands and information into the computing device 1220 by using input devices, such as a keyboard 1240 and/or pointing device, such as a mouse 1242, which are connected to the system bus 1223 via a serial port interface 1246. Other types of pointing devices (not shown in FIG. 8) include track pads, track balls, pens, head trackers, data gloves and other devices suitable for positioning a cursor on a computer monitor 1247. The monitor 1247 or other kind of display device is connected to the system bus 1223 via a video adapter 1248.

The remote computer 1211 in this networked environment is connected to a remote memory storage device 1250. This remote memory storage device 1250 is typically a large capacity device such as a hard disk drive, CD-ROM or DVD drive, magneto-optical drive or the like. Those skilled in the art will understand that software modules are provided to the remote computer 1211 via computer-readable media. The computing device 1220 is connected to the remote computer by a network interface 1253, which is used to communicate over the local area network 1273.

In an alternative embodiment, the computing device 1220 is also connected to the remote computer 1211 by a modem 1254, which is used to communicate over the wide area network 1252, such as the Internet. The modem 1254 is connected to the system bus 1223 via the serial port interface 1246. The modem 1254 also can be connected to the public switched telephone network (PSTN) or community antenna television (CATV) network. Although illustrated in FIG. 8 as external to the computing device 1220, those of ordinary skill in the art can recognize that the modem 1254 may also be internal to the computing device 1220, thus communicating directly via the system bus 1223. Connection to the remote computer 1211 via both the local area network 1273 and the wide area network 1252 is not required, but merely illustrates alternative methods of providing a communication path between the computing device 1220 and the remote computer 1211.

Although other internal components of the computing device 1220 are not shown, those of ordinary skill in the art will appreciate that such components and the interconnection between them are well known. Accordingly, additional details concerning the internal construction of the computing device 1220 need not be disclosed in connection with the present invention.

Those skilled in the art will understand that program modules, such as an operating system 1235 and other software modules 1260*a*, 1263*a* and 1266*a*, and data are provided to the computing device 1220 via computer-readable media. In the preferred computing device, the computer-readable media include the local or remote memory storage devices, which may include the local hard disk drive 132, floppy disk 129, CD-ROM or DVD 1231, RAM 1225, ROM 1224, and the remote memory storage device 1250.

Those skilled in the art will recognize that the foregoing embodiments are merely illustrative and that the invention can be implemented with a variety of computing devices in a variety of different architectures. For example, the components of the computing device can be distributed among multiple computers in various locations. As another example, the sequence of steps described in connection with each of the foregoing embodiments are illustrative and certain steps can occur in other sequences in alternate embodiments of the invention. Other changes may be made to the foregoing embodiments without departing from the spirit and scope of the invention as defined in the claims.

We claim:

1. A computer-implemented method for processing a remittance transaction comprising the steps of:
   receiving, by a mobile platform computer from a funding agency computer, a portion of the registration data comprising a mobile personal identifier and a mobile handset identifier of a mobile handset;
   storing, by the mobile platform computer, the mobile personal identifier and the mobile handset identifier received from the funding agency computer;
   transmitting, by the mobile platform computer, a random authentication code to the mobile handset;
   transmitting, by the mobile platform computer, the random authentication code to the funding agency computer, wherein the funding agency verifies the mobile handset based on the random authentication code;
   responsive to verifying the mobile handset and responsive to receiving a request to initiate a remittance transaction at the funding agency computer, receiving, by the mobile platform computer, a verification request associated with the remittance transaction, the verification request received from the funding agency computer that is configured to receive the request to initiate the remittance transaction and transmit the verification request responsive to receiving the request to initiate the remittance transaction, the verification request comprising the mobile handset identifier;
   responsive to receiving the verification request from the funding agency computer, transmitting, by the mobile platform computer, a request for a mobile personal identifier to the mobile handset associated with the mobile handset identifier;
   receiving, by the mobile platform computer, the mobile personal identifier from the mobile handset and determining that the mobile personal identifier received from the mobile handset matches the mobile personal identifier that is stored in the mobile platform computer; and
   transmitting, by the mobile platform computer to the funding agency computer, a verification based on a determination that the mobile personal identifier received from the mobile handset matches the mobile personal identifier that is stored in the mobile platform computer.

2. The method of claim 1, wherein the mobile handset identifier and the mobile personal identifier are registered with the mobile platform computer prior to the remittance transaction.

3. The method of claim 1, wherein the mobile platform computer receives a receipt from the funding agency computer upon completion of the remittance transaction and transmits the receipt to the mobile handset.

4. The method of claim 1, wherein a transfer request process comprises:
   the mobile handset device transmitting the request for the remittance transaction to the funding agency computer, the request comprising a funding account, a recipient and an amount;
   the mobile handset device taking a photograph of a check drawn on the funding account and transmitting the photograph of the check to the funding account; and
   the funding account computer completing the remittance transaction by drawing the amount from the funding account.

5. A computer-implemented method for processing a remittance transaction comprising the steps of:
   receiving, at a mobile platform computer, a request for a mobile software application from a mobile handset;
   transmitting, by the mobile platform computer, a message to the mobile handset to initiate a download of the mobile software application;
   downloading, by the mobile platform computer, the requested mobile software application to the mobile handset;
   after downloading the mobile software application to the mobile handset and prior to receiving a verification request associated with the remittance transaction, verifying, by the mobile platform computer, the mobile handset, wherein the mobile handset verification process comprises:
   receiving, by the mobile platform computer from a funding agency computer, a mobile handset identifier and a request for a random authentication code;
   transmitting, by the mobile platform computer, the random authentication code to the funding agency computer;
   receiving, by the mobile platform computer from the mobile handset associated with the mobile handset identifier, the random authentication code manually entered into the mobile software application and transmitted by the mobile handset;
   determining, by the mobile platform computer, that the received random authentication code matches the random authentication code that was transmitted to the funding agency computer;
   transmitting a verification message to the funding agency computer upon positive determination that that the received random authentication code matches the random authentication code that was transmitted to the funding agency computer;
   after the mobile handset verification and responsive to receiving a request to initiate a remittance transaction at the funding agency computer, receiving, by the mobile platform computer, the verification request associated with the remittance transaction, the verification request is received from the funding agency computer that is configured to receive the request to initiate the remittance transaction and transmit the verification request responsive to receiving the request to initiate the remittance transaction, the verification request comprising the mobile handset identifier;
   responsive to receiving the verification request from the funding agency computer, transmitting, by the mobile platform computer, a request for a mobile personal identifier to a mobile handset associated with the mobile handset identifier;
   receiving, by the mobile platform computer, the mobile personal identifier from the mobile handset and determining that the mobile personal identifier received from the mobile handset associated with the mobile handset identifier matches a mobile personal identifier stored in the mobile platform computer during a registration process; and
   transmitting, by the mobile platform computer, to the funding agency computer verification based on the determination that the mobile personal identifier received from the mobile handset associated with the mobile handset identifier matches a mobile personal identifier stored in the mobile platform computer during a registration process.

6. The method of claim 5, wherein responsive to verifying the mobile handset a funding account verification process is performed comprising the steps of:
 transmitting, by the funding agency computer, a test amount of funds for deposit in a funding account identified by a customer; and
 receiving, by the funding agency computer from the mobile handset device, an amount matching the test amount of funds as determined by the customer having checked a balance of the funding account.

7. The method of claim 5, wherein the mobile handset identifier and the mobile personal identifier are stored at the mobile platform computer.

8. The method of claim 5, wherein the mobile platform computer receives a receipt from the funding agency computer upon completion of the remittance transaction and transmits the receipt to the mobile handset.

9. The method of claim 5, wherein a transfer request process comprises:
 the mobile handset device transmitting the request for the remittance transaction to the funding agency computer, the request comprising a funding account, a recipient and an amount;
 the mobile handset device taking a photograph of a check drawn on the funding account and transmitting the photograph of the check to the funding account; and
 the funding account computer completing the remittance transaction by drawing the amount from the funding account.

10. A computer-implemented method for processing a remittance transaction comprising the steps of:
 receiving, at a mobile platform computer, a request for a mobile software application from a funding agency computer that received the request from a mobile handset;
 transmitting, by the mobile platform computer, a message to a mobile handset to initiate a download of the mobile software application;
 downloading, by the mobile platform computer, the requested mobile software application to the mobile handset;
 receiving, by a mobile platform computer from the funding agency computer, registration data and secure element data of the mobile handset;
 based on the received registration data and the secure element data, provisioning, by the mobile platform computer, the secure element on the mobile handset with a payment card application;
 personalizing, by the mobile platform computer, the provisioned payment card application;
 after personalizing and prior to receiving a verification request associated with the remittance transaction, verifying, by the mobile platform computer, a funding account;
 after the funding account verification and responsive to receiving a request to initiate a remittance transaction at the funding agency computer, receiving, by the mobile platform computer, the verification request associated with the remittance transaction, the verification request received from the funding agency computer that is configured to receive the request to initiate the remittance transaction and transmit the verification request responsive to receiving the request to initiate the remittance transaction, the verification request comprising a mobile handset identifier;
 responsive to receiving the verification request from the funding agency computer, transmitting, by the mobile platform computer, a request for a mobile personal identifier to the mobile handset associated with the mobile handset identifier;
 receiving, by the mobile platform computer, the mobile personal identifier from the mobile handset and determining that the mobile personal identifier received from the mobile handset associated with the mobile handset identifier matches a mobile personal identifier stored in the mobile platform computer during a registration process; and
 transmitting, by the mobile platform computer, to the funding agency computer a verification based on the determination that the mobile personal identifier received from the mobile handset associated with the mobile handset identifier matches a mobile personal identifier stored in the mobile platform computer during a registration process.

11. The computer-implemented method of claim 10, wherein the mobile handset verification process comprises:
 receiving, by the mobile platform computer, a request for a portion of the transaction history associated with the funding account and the secure element data;
 responsive to receiving the request for the portion of the transaction history, requesting, by the mobile platform computer, the funding account computer for the portion of the transaction history associated with the funding account based on the secure element data;
 responsive to the request, receiving, by the mobile computing device, the portion of the transaction history from the funding account computer; and
 responsive to receiving the portion of the transaction history, transmitting, from the mobile computing device to the mobile handset, the portion of the transaction history associated with the funding account, wherein the mobile handset transmits information from the portion of the transaction history to the funding agency computer to verify the funding account.

* * * * *